United States Patent
Baker et al.

(10) Patent No.: US 7,914,240 B2
(45) Date of Patent: Mar. 29, 2011

(54) CUTTING TOOL

(75) Inventors: Ian J Baker, Burton Upon Trent (GB); Stephen I Heatherglen, Coventry (GB)

(73) Assignee: Rolls-Royce plc, London (GB)

( * ) Notice: Subject to any disclaimer, the term of this patent is extended or adjusted under 35 U.S.C. 154(b) by 423 days.

(21) Appl. No.: 11/826,596

(22) Filed: Jul. 17, 2007

(65) Prior Publication Data

US 2007/0257544 A1   Nov. 8, 2007

Related U.S. Application Data

(63) Continuation of application No. PCT/GB2005/004796, filed on Dec. 13, 2005.

(30) Foreign Application Priority Data

Jan. 20, 2005  (GB) .................................. 0501134.1

(51) Int. Cl.
 *B23B 27/10* (2006.01)
 *B23B 27/16* (2006.01)
(52) U.S. Cl. .............. 407/11; 407/83; 407/89; 409/136; 408/60
(58) Field of Classification Search .................. 409/136; 408/60, 61; 407/81, 83, 89, 11
 See application file for complete search history.

(56) References Cited

U.S. PATENT DOCUMENTS

| | | | |
|---|---|---|---|
| 5,340,242 A | | 8/1994 | Armbrust |
| 5,718,156 A | * | 2/1998 | Lagrolet et al. ................ 82/1.11 |
| 2002/0189413 A1 | | 12/2002 | Zurecki |

FOREIGN PATENT DOCUMENTS

| | | |
|---|---|---|
| EP | 0 211 652 A | 2/1987 |
| EP | 0 656 239 A | 11/1994 |
| JP | 06023648 A * | 2/1994 |
| WO | WO 96/05008 A | 2/1996 |

OTHER PUBLICATIONS

Iscar letter dated Nov. 24, 2008.
Iscar Third Party Observations filed on Jul. 1, 2009 in corresponding European Patent Application.
Declaration of Mr. Enser dated Feb. 25, 2009.
Rolls-Royce letter dated Dec. 19, 2008.
Iscar letter dated Mar. 24, 2009.
Iscar article dated May 2007, which published in Jun. 2007.

* cited by examiner

*Primary Examiner* — Sunil Singh
(74) *Attorney, Agent, or Firm* — Jeffrey S. Melcher; Manelli Denison & Selter PLLC

(57) ABSTRACT

A cutting tool (10) comprises a shank (12) for receiving a cutting insert (14) and a block (16) for delivering a flow of fluid to the cutting insert (14). Fluid is delivered to the cutting insert (14) through a fluid passageway (18) that extends through the shank (12) and the block (16). The block (16) is pivotable mounted on the shank (12). The block (16) pivots about screw (22) between a first and a second position. In the first position the block (16) is held in sealing arrangement with the shank (12) to allow the passage of a coolant through the fluid passage (18) to the cutting insert (14). In the second position the block (16) has moved to allow removal of the cutting insert (14) from the shank (12).

1 Claim, 2 Drawing Sheets

CUTTING TOOL

CROSS-REFERENCE TO RELATED APPLICATIONS

This application is a continuation of International Application No. PCT/GB2005/004796, filed 13 Dec. 2005 designating the United States, which claims priority to GB 0501134.1 filed 20 Jan. 2005.

The present invention relates to a cutting tool suitable for machining a workpiece. In particularly the cutting tool is suitable for high speed machining operations such as turning.

BACKGROUND OF THE INVENTION

Cutting tools for performing machining operations generally comprise a removable cutting insert mounted in the tool. The cutting insert is clamped to the tool so that the cutting edge of the insert protrudes to engage with a workpiece.

During machining the cutting edge becomes worn and the cutting insert will eventually need replacing. The harder the material used in the insert the longer the insert can be used before the wear is sufficient that the insert must be replaced. The hardness of the insert is directly related to the working temperature and as the working temperature rises there is an associated reduction in hardness, and a consequent increase in the rate of wear.

To extend the life of the cutting insert it is therefore known to provide a flow of coolant to the cutting edge of the insert. The coolant also acts to lubricate the interface between the cutting edge and the workpiece and to break up and remove any swarf, which may cause damage to the insert, the work piece or both.

As there is limited space between the cutting insert and the workpiece into which the coolant can be injected it is preferred to feed the coolant through the tool to the cutting insert.

Cutting tools are known in which coolant passes through the tool and is directed to the cutting face of the insert. The coolant passes through the tool into a block, known as a coolant inducer, which is fastened above the cutting insert. The inducer has a fluid passage therethough and directs the coolant to outlets adjacent the cutting face of the insert.

U.S. Pat. No. 5,340,242 discloses an arrangement in which a cutting tool has an inducer 30 described as an orifice cap. The orifice cap 30 directs a high velocity stream at the cutting edge 22 to break a chip of material removed from the workpiece. A discharge orifice 42 in the orifice cap 30 directs the fluid stream just above the cutting edge of the insert 20. A cap screw 44 allows the orifice cap 30 to move to adjust the direction of the fluid stream exiting from the orifice 42.

To improve the efficiency of the cutting tool the coolant should be delivered close to the cutting face of the insert. To achieve this the inducer extends over at least a portion of the cutting insert.

With this arrangement, the inducer must be fastened securely to the tool to prevent relative movement or leakage of the coolant from between the inducer and the tool. This results in problems when the cutting insert needs to be replaced. The fasteners and the inducer have to be removed to allow the insertion of a new cutting insert. This causes delays in the production process and parts may be lost or damaged when they are removed.

The present invention seeks to provide an improved cutting tool having a coolant inducer that may be easily released to allow replacement of the cutting inserts when necessary.

SUMMARY OF THE INVENTION

According to the present invention a cutting tool comprises a shank for receiving a cutting insert and a block mounted on the shank adjacent to the cutting insert, the block having at least one fluid passage for delivering a flow of fluid to the cutting insert, the block extending over at least a portion of the cutting insert and is pivotably mounted on the shank so that the block can move between a first position whereby in operation a flow of fluid passes to the cutting insert and an second position to allow removal of the cutting insert.

In one embodiment of the present invention the block pivots in the same plane from the first to the second position.

In a second embodiment of the present invention the block pivots from a first position in one plane to a second position in another plane.

Preferably the fluid passage extends through both the shank and the block, the fluid passage in the shank and the block is in fluid communication when the block is in the first position.

The fluid passage extends though the block to at least one fluid outlet adjacent the cutting insert. Preferably there are two fluid outlets adjacent to the cutting edge of the cutting insert and they may be provided on an inclined face of the block.

In the preferred embodiments of the present invention a seal is provided to seal between the fluid passages at the interface between the shank and the block.

A locking mechanism may be provided to hold the block in sealing relationship with the shank. The locking mechanism comprises a pivotal member mounted on the shank that engages with a recess in the block.

BRIEF DESCRIPTION OF THE DRAWINGS

The present invention will now be described with reference to the accompanying drawings in which.

DETAILED DESCRIPTION OF THE INVENTION

Figure 1:
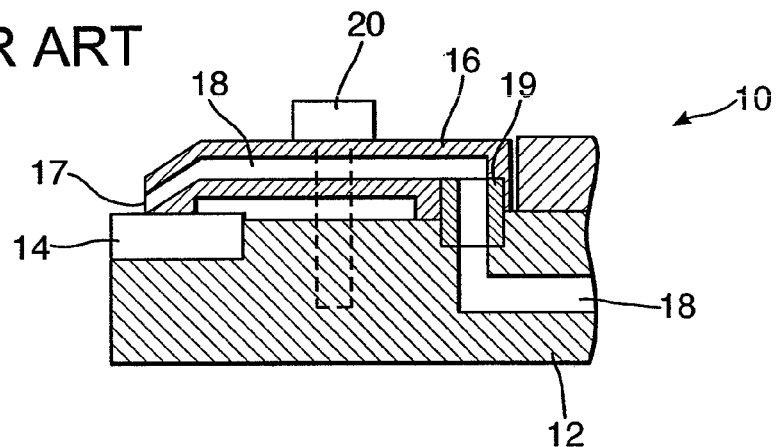
FIG. 1 is a part sectional view of a known cutting tool.

FIG. 1 shows a conventional cutting tool 10 used to machine a workpiece (not shown). The cutting tool 10 has a shank 12, which is adapted to receive a cutting insert 14. A block 16 is attached to the shank 12 above the cutting insert 14.

A fluid passage 18 extends through both the shank 12 and the block 16. In operation a coolant is fed through the fluid passage 18 and discharges from a fluid outlet 17 in the block 16, which is adjacent to the cutting insert 14. The coolant is discharged from the fluid outlet 17 to cool the cutting edge of the insert 14. To prevent leakage of the coolant from between the shank 12 of the tool and the block 16 a seal 19 is provided and the block 16 is firmly secured to the shank 12 of the tool by a fastener 20.

During machining the cutting insert 14 must be replaced at regular intervals. This involves the removal of the fastener 20, block 16 and the seal 19. Once the new insert is in position the seal 19, the block 16 and fastener 20 must all be accurately replaced to prevent leakage.

The need to remove individual components from the cutting tool 10 leads to a long interruption in the machining process and carries a risk that the parts 16, 19 and 20 may be damaged or lost.

FIGS. 2-4 show improved cutting tools 10 in accordance with different embodiments of the present invention. For ease of reference the same reference numerals have been used as in FIG. 1 for the common component parts.

Figure 2A:
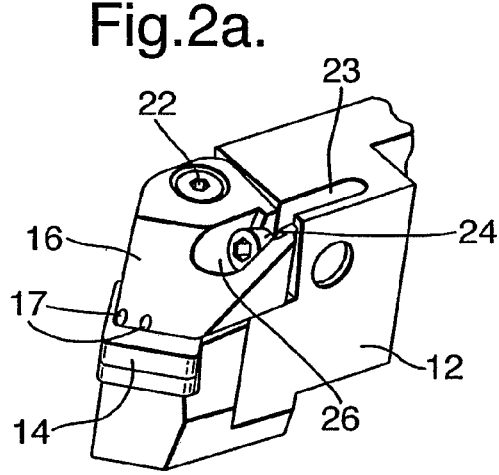
FIGS. 2a and 2b are schematic views of part of a cutting tool in accordance with a first embodiment of the present invention.

In the embodiment of the present invention shown in FIGS. 2a and b, the block 16 is pivotally mounted on the shank 12. The block 16 pivots about the shoulder screw 22 between a first position shown in FIG. 2a and a second position shown in FIG. 2b.

Figure 2B:
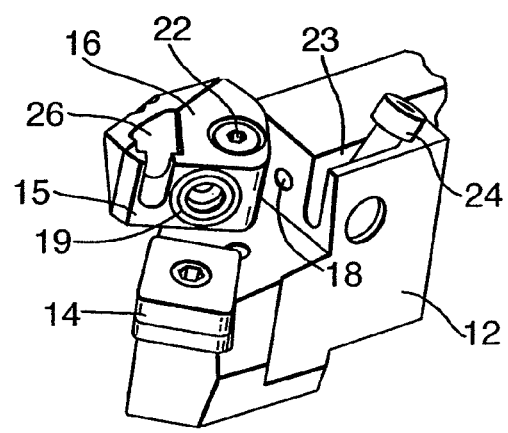

During machining operations the block 16 is in the first position shown in FIG. 2a. A seal 19, FIG. 2b, is provided on the rear face 15 of the block 16 and seals around the fluid passage 18 at the interface between the shank 12 and the block 16. An anchor screw 24, pivotally mounted in a recess 23 in the shank 12, engages with a recess 26 in the block 16 to pull the block 16 back towards the shank 12. The anchor screw 24 locks the block 16 to the shank 12 and ensures that a good seal is maintained to prevent coolant leakage.

When the cutting insert 14 is to be replaced the anchor screw 24 is moved out of the recess to release the block 16 from the shank 12. The block 16 is then pivoted about the shoulder screw 22 to expose the cutting insert 14, FIG. 2b. The cutting insert 14 can then be removed and replaced with a new insert.

Figure 3A:
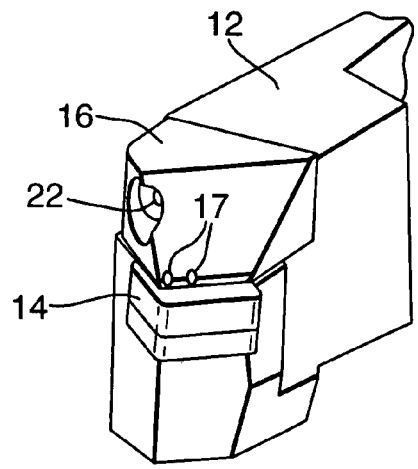
FIGS. 3a and 3b are schematic views of part of a cutting tool in accordance with a second embodiment of the present invention.
Figure 3B:
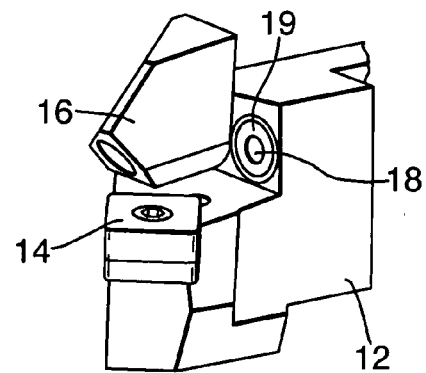

FIGS. 3a and 3b show an alternative design in which the block 16 pivots, about shoulder screw 22, through 90° onto a side face when moved from the first to the second position.

Figure 4A:
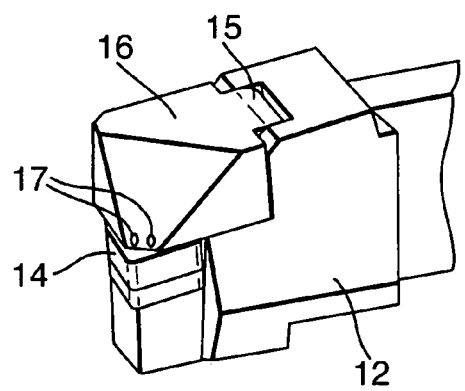
FIGS. 4a and 4b are schematic views of part of a cutting tool in accordance with a third embodiment of the present invention.
Figure 4B:
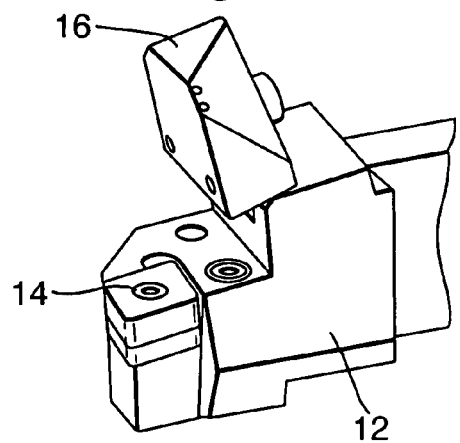

FIGS. 4a and 4b show a further design in which the rear face 15 of the block 16 is hinged and the block moves upwards into the second position shown in FIG. 4b.

Pivotal movement of the block 16 relative to the shank 12 of the tool offers the advantage that the block 16 can be easily moved out of the way when the cutting insert 14 needs to be replaced. None of the parts need to be removed from the tool 10 when the cutting insert 14 is replaced. This reduces the time taken to replace the inserts 14 and prevents loss or damage of parts of the tool 10.

It will be appreciated by one skilled in the art that a cutting tool 10 in accordance with the present invention can be used in any machining operation such as turning, boring, shaping, grooving, threading or milling.

The invention claimed is:

1. A cutting tool comprising:
   a cutting insert;
   a shank for receiving said cutting insert; and
   a block mounted on the shank adjacent to the cutting insert, the block having at least one fluid passage for delivering a flow of fluid to the cutting insert, the block extending over at least a portion of the cutting insert, the block is pivotably mounted on the shank so that the block can move between a first position whereby in operation a flow of fluid passes through the fluid passage to the cutting insert and a second position to allow removal of the cutting insert, wherein a locking mechanism is provided to hold said block in sealing relationship with said shank, and wherein said locking mechanism comprises a pivotal member mounted on the shank that engages with a recess in the block.

* * * * *